Feb. 2, 1971  E. J. KOSINSKY ET AL  3,559,240
BULK PLASTIC HANDLING

Filed July 19, 1967  2 Sheets-Sheet 1

INVENTORS
E. J. KOSINSKY
W. E. SAUNDERS
BY
Young · Zuigg
ATTORNEYS

INVENTORS
E. J. KOSINSKY
W. E. SAUNDERS

United States Patent Office 3,559,240
Patented Feb. 2, 1971

3,559,240
BULK PLASTIC HANDLING
Edward J. Kosinsky and William E. Saunders, Bartlesville, Okla., assignors to Phillips Petroleum Company, a corporation of Delaware
Filed July 19, 1967, Ser. No. 654,458
Int. Cl. B29f 3/01
U.S. Cl. 18—12                                     4 Claims

ABSTRACT OF THE DISCLOSURE

Compressible bulk material in particulate form is fed to an extruder by means of a force feeder having compression and metering sections provided with grooves substantially aligned with the direction of plastic flow wherein the bulk plastic is substantially compressed prior to injection into the extruder.

BACKGROUND OF THE INVENTION

Figure 1:
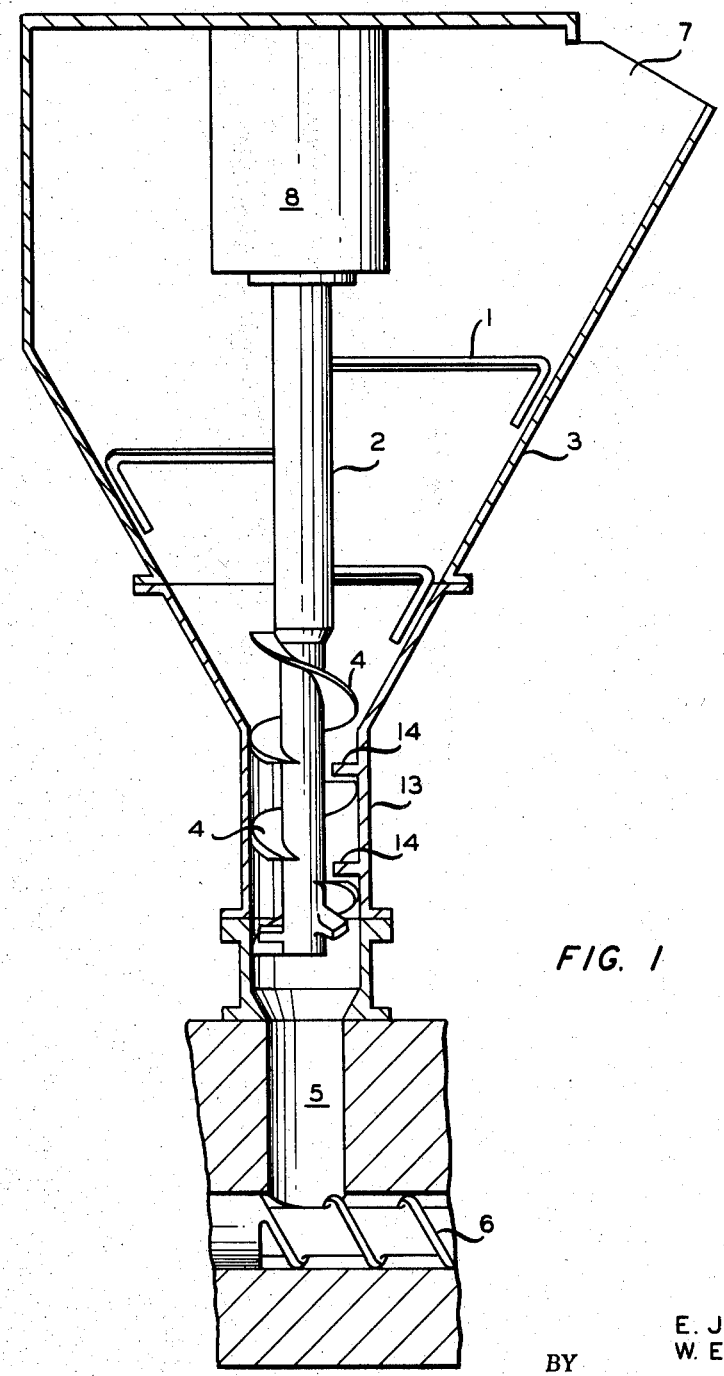

Extrusion is well known in the art of processing plastic materials herein intended to include natural and synthetic plastic and elastomeric products and materials that can be rendered workable at either elevated or reduced temperatures. In essentially all extrusion processes, it is desirable to maintain steady state operation to enable the production of extrudates of uniform physical characteristics at a uniform rate. The difficulties involved in the attainment of such conformity are usually amplified at increased extrusion rates with the result that the capacity of conventional extrusion apparatus is limited by the necessity of producing uniform products.

It is therefore one object of this invention to provide process and apparatus for the extrusion of compressible materials. It is another object of this invention to provide process and apparatus for increasing the capacity of conventional extruders. It is yet another object of this invention to provide process and apparatus for extruding relatively low density compressible bulk materials.

SUMMARY OF THE INVENTION

In accordance with one embodiment of this invention relatively low density compressible bulk material is gathered in bulk form, compressed and metered under compression to an extruder.

The problems which occur in the extrusion of these materials having relatively low density in bulk form are due primarily to reduction in volume during extrusion. As a result, it will be apparent that the process and apparatus of this invention are applicable to the extrusion of essentially all compressible materials, including natural and synthetic plastic and elastomeric products which exhibit a substantial increase in density, i.e., decrease in volume during extrusion relative to the volume occupied by the material in bulk form prior to extrusion.

The plastics intended to be comprehended within the scope of this invention include essentially all organic and inorganic natural and synthetic plastics, elastomers, gums, rosins, etc., including such materials as glass fiber, asbestos, films, foams, etc. The physical characteristics of the bulk form of these materials prior to extrusion is intended to encompass all forms of these materials having densities lower than the particle density of the material. For example, these bulk forms can include continuous or subdivided foams, films, fibers, filaments, webs, polymer fluff such as the preferred physical form of the polyethylene produced by the process disclosed in U.S. Pat. 2,825,-721, and numerous others.

Although any of the materials above described can be employed within the concept of this invention in that the process and apparatus involved are intended to accommodate differences between particle density and the density of the bulk material, this concept is considered most favorable where the particle form and bulk densities differ by a factor of at least 3. Materials having particle form to bulk density ratios differing by a lesser factor do not generally require the use of the power feeder herein disclosed. However, even where this density factor is relatively low, certain advantages including increased extrusion rates and greater uniformity of extruder operation are realized by the use of the process and apparatus of this invention. The particle densities of these materials are usually within the range of from about 53 to about 60 pounds per cubic foot and their bulk densities are preferably within the range of from about 3 to about 30 and preferably from 10 to about 25 pounds per cubic foot. The compression ratio of the power feeder hereinafter detailed preferably varies depending on the particle form and bulk densities of the material to be extruded and is generally within the range of from about 3 to about 12. As a result, the factor by which the bulk density of the treated material is increased in the power feeder is usually within the range of from about 3 to about 12.

In the preferred embodiment of this invention the power feeder comprises a metering section which serves to maintain the compressed state of material leaving the compression section and to meter that material at a predetermined rate to the extruder intake. However, it should be understood that this metering function can be accomplished by the compression section alone, although a more adequate degree of control can be accomplished by the combination of compression and metering sections throughout a range of operating conditions.

Figure 2:
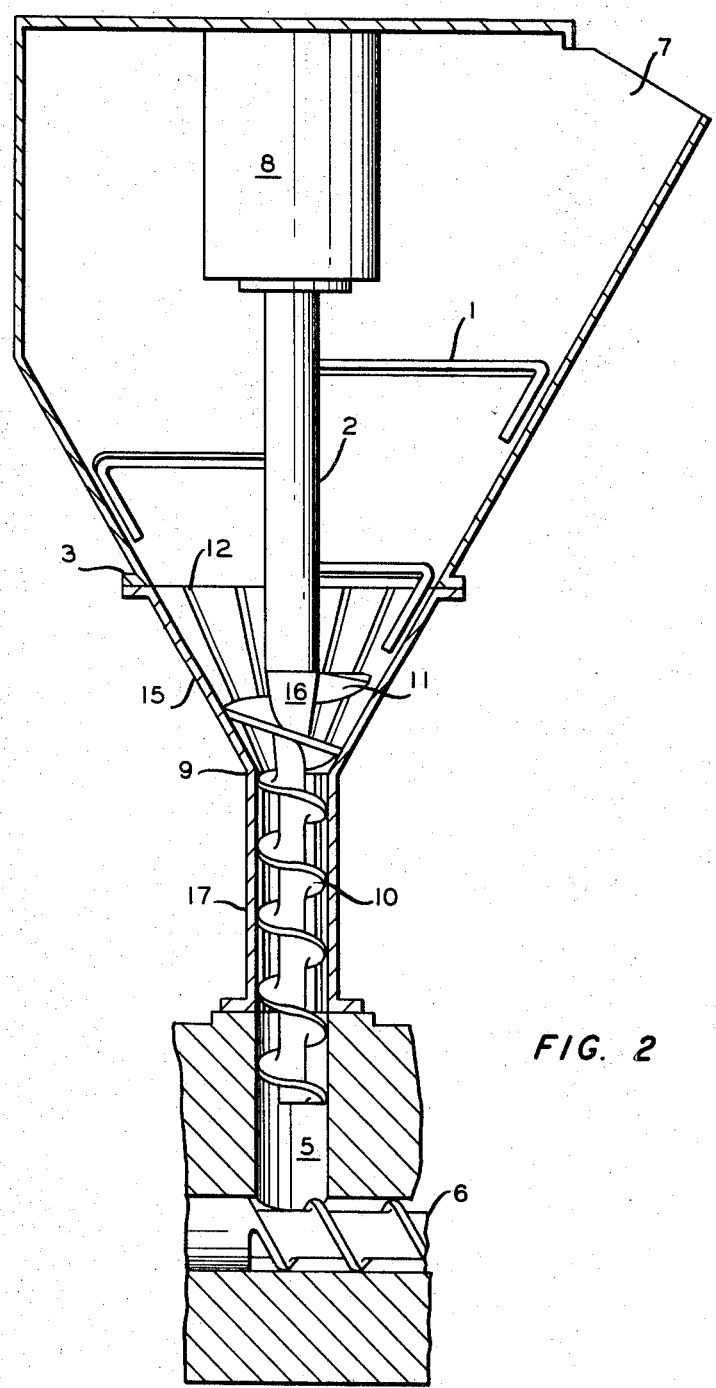

The concept of this invention can be better understood by reference to the drawings of which FIG. 1 is a schematic illustration of a commercially available Baker-Perkins size 4 power feeder. FIG. 2 is a schematic illustration of the preferred embodiment of this invention illustrating the power feeder having compression and metering sections.

Referring now to the drawings, FIG. 1 illustrates in schematic form a commercially available power feeder 3 in combination with commercially available extruder 6. Several extruders which have been employed in demonstrating the concept of this invention are an electrically heated 2½ inch, 24:1L/D/NRM Model 55–EH which is a modified form of Model 50, illustrated in National Rubber Machinery Company bulletin 25M–2163–853 with double pump screw with increased power to allow operation at speeds up to 160 r.p.m.; 2½ inch, 24:1L/D Prodex Model HT25 with a two-stage screw, manufactured by Prodex Equipment Company of Fords, N.J.

The plastic material is introduced to hopper 3 by way of inlet 7 wherein it is first contacted with rotating vanes 1 mounted on driving axis 2 powered by suitable driving means 8. The bulk plastic gravity feeds to forcing section 13 comprising continuous helical flight 4 mounted on driving axis 2 by which bulk plastic is continuously metered by way of conduit 5 to extruder 6.

The numbering of several of the elements of FIG. 2 is identical to that of FIG. 1 where a similar apparatus is employed. The compression section 15 of the preferred embodiment comprises converging continuous helix 11 mounted on a preferably tapered section 16 of driven axis 2. The outer periphery of converging helix 11 preferably cooperates with the inner surface of the housing 3 to prevent slippage of plastic between the helix and the side walls. Converging helix 11 preferably extends to elevation 9 from which point downward the flight depth and pitch of the metering helix 10 in metering section 17 remains substantially constant.

Bulk plastic introduced to the hopper by way of inlet 7 is gravity fed to gathering and compressing section 15 wherein the bulk density is preferably increased by a factor of from about 3 to about 12. In this embodiment the ratio of the flight depth at the beginning of the compression section to the flight depth at the beginning of the metering section is preferably within the range of from about 1.5 to about 3. Flight depth is herein intended to define the effective radius of the helix. Similarly, the ratio of the pitch of compressor section helix 11 at the inlet to the compression section to the pitch at the exit of the compression section, i.e., at elevation 9 is within the range of from about 0.75 to about 1.5, and preferably 1.

The lower portion of bin 3 in the proximity of compression section 15 is preferably further provided with grooves 12 substantially aligned with the driven axis 2. However, it should be understood that the orientation of grooves 12 can vary considerably, although they are more effective in deterring the rotation of plastic under the influence of helix 11 in compression section 15 when aligned with the axis of the helix.

EXAMPLE I

Polyethylene fluff produced by the process of U.S. patent above mentioned and having a bulk density of 5.8 pounds per cubic foot and a particle density of from 53 to about 60 pounds per cubic foot was fed to the unmodified Baker-Perkins Power Feeder illustrated in FIG. 1 in combination with the 2½ inch 24:1L/D/NRM extruder with the result that the polymer fluff bridged at the bottom throat of the feed hopper. In addition, the entire mass of plastic in the feed hopper turned with the screw during this operation with the result that polymer feed to the extruder was insignificant.

EXAMPLE II

Several operations were conducted with a modified Baker-Perkins Power Feeder having a constant diameter straight section communicating between the feed hopper and the extruder having the same diameter as the feed port of the 2½ inch NRM extruder, i.e., 2½ inches. Vertical grooves ⅜ inch wide and ¹⁄₁₆ inch deep were machined in the walls of the lower section, corresponding to compression section 15 of FIG. 2, to prevent plastic in the hopper from turning with the screw.

The first screw employed with the modified power feeder had a constant flight depth of ½ inch. However, polyethylene fluff having bulk density of less than 10 pounds per cubic foot was difficult to extrude. These results are illustrative in the following table. The power feeder was too restrictive and failed to pick up feed uniformly thereby causing uneven feeding and severe extrudate surging. However, the polymer fluff in the feed hopper did not turn with the feeder screw as was the case with the unmodified Baker-Perkins Power Feeder, thereby evidencing the effectiveness of the shallow machined grooves in the lower section of the hopper.

A second modified power feeder screw having a constant ¾ inch flight depth was employed in a modified Baker-Perkins Power Feeder operating on several polymer fluffs having bulk densities from 7 to 10 pounds per cubic foot. These materials were handled by the modified power feeder in combination with the NRM and Prodex extruders with slight to moderate surge as illustrated in the following table. However, in order to minimize extrudate surge when operating on polymer fluffs having bulk densities of from 3 to 6 pounds per cubic foot, it was necessary to reduce the extruder screw speed to the range of from 65 to 85 r.p.m. corresponding to extrusion rates within the range of from 53 to 78 pounds per hour as illustrated in the table.

The power feeder screw was further modified by forming the upper section within the lower portion of the hopper as an inverted cone having a flat upper surface in combination with a straight helical screw in the lower section communicating with the Prodex extruder. Each section had a continuous flight depth of ½ inch and the upper section of the power feeder screw had an approximate compression ratio of 3:1. Although this screw (No. 3 in the table) provided increased extrusion rate as compared to the straight screws (Nos. 1 and 2 of the table), the polymer fluff bridged between the side wall of the hopper and the upper flat surface of the inverted cone portion of the screw causing uneven polymer pickup and extrudate surging as illustrated in the table.

The tapered screw was then modified to increase feeding capacity and to allow more uniform feed pickup by tapering the flight depth from 1 inch at the top of the flight to ¾ inch at the base of the cone, i.e., elevation 9 in FIG. 2, while providing the lower straight metering portion of the screw with a constant ¾ inch flight depth. A cone was placed on the upper flat surface of the inverted cone of screw No. 3 to minimize the above-described bridging problem. The compression ratio of the screw was approximately 5:1. As illustrated in the table, 8 lots of polymer fluff having bulk densities ranging from 4.1 to 6.3 pounds per cubic foot were extruded without considerable difficulty at extrusion rates of from 92 to 135 pounds per hour at an extruder speed of 100 r.p.m. and maximum power feeder speed. However, the polymer fluff continued to bridge on the shoulder of this modified power feeder screw (No. 4 in the table) similarly to the problem observed in the operation of the No. 3 screw above described. This problem was particularly apparent where the level of polymer fluff in the feed hopper was above the top of the sweeper arms 1 illustrated in the drawings. Consequently, extrudate surging and a drop in extrusion rate were experienced at the higher levels of feed to the hopper.

The power feeder screw was further modified as illustrated in FIG. 2 to overcome the bridging tendencies of screw No. 4. In this form (No. 5 in the table) as illustrated in the drawings, the top section of the screw was tapered and there was no shoulder on the upper edge of the intake section. The flight depth varied from 2 inches maximum at the upper extremity of hte compressor section to ¾ inch at elevation 9. The lower straight section of the screw had a constant flight depth of ¾ inch. The compression ratio of this apparatus was 7:1. Extrusion rates in the Prodex extruder ranged from 85 to 124 pounds per hour at 100 r.p.m. extruder screw speed when operating on polyethylene fluffs having bulk densities from 3.5 to 5.8 pounds per cubic foot, respectively, as illustrated in the table. However, it was necessary to reduce extruder screw speed to 75 r.p.m. to minimize extrudate surge when operating on polyethylene fluff having a bulk density of 2.9 pounds per cubic foot with a consequent reduction in extrusion rate to 55 pounds per hour.

TABLE I

| Power feeder | | Bulk density, lb./ft.³ | Extruder | | Extrusion rate, lb./hr. | Extruder surge |
|---|---|---|---|---|---|---|
| Screw No. | r.p.m. | | Type | r.p.m. | | |
| 1 | 31 | 9.7 | NRM | 105 | 86 | Severe. |
| 1 | 34 | 10.5 | NRM | 105 | 95 | Do. |
| 1 | 34 | 15.0 | NRM | 146 | 137 | Slight. |
| 2 | 33 | 10.1 | NRM | 108 | 105 | Moderate. |
| 2 | 42 | 5.3 | NRM | 108 | 79 | Do. |
| 2 | 44 | 6.6 | Prodex | 100 | 95 | Very slight. |
| 2 | 47 | 7.05 | do | 100 | 105 | Do. |
| 2 | 40 | 8.8 | do | 100 | 108 | Slight. |
| 2 | 45 | 5.3 | do | 75 | 78 | Moderate. |
| 2 | 48 | 3.5 | do | 65 | 51 | None. |
| 2 | 48 | 3.7 | do | 64 | 56 | Do. |
| 2 | 46 | 3.2 | do | 63 | 53 | Do. |
| 2 | 45 | 6.6 | do | 100 | 88 | Very slight. |
| 2 | 46 | 6.2 | do | 100 | 86 | Slight. |
| 2 | 45 | 4.2 | do | 65 | 55 | Do. |
| 2 | 46 | 3.5 | do | 100 | 64 | Do. |
| 2 | 48 | 3.3 | do | 75 | 58 | Very slight. |
| 3 | 45 | 5.4 | do | 75 | | Overload extruder. |
| 3 | 45 | 5.4 | do | 100 | 94 | Very slight. |
| 3 | 49 | 5.4 | do | 125 | 95 | Moderate. |
| 4 | | 4.9 | do | 100 | 97 | Do. |
| 4 | | 5.4 | do | 100 | 94 | Do. |
| 4 | 42 | 4.3 | do | 100 | 94 | Do. |
| 4 | 48 | 4.1 | do | 100 | 92 | Slight. |
| 4 | 44 | 5.6 | do | 100 | 110 | Do. |
| 4 | 40 | 6.3 | do | 100 | 122 | Very slight. |
| 4 | 43 | 5.9 | do | 100 | 123 | Do. |
| 4 | 49 | 6.0 | do | 100 | 135 | Do. |
| 5 | 44 | 2.9 | do | 75 | 55 | Slight. |
| 5 | 36 | 4.8 | do | 100 | 116 | None. |
| 5 | 45 | 4.0 | do | 100 | 106 | Slight. |
| 5 | 41 | 3.5 | do | 100 | 86 | Very slight. |
| 5 | 40 | 4.4 | do | 100 | 120 | Slight. |
| 5 | 44 | 4.7 | do | 125 | 113 | Do. |
| 5 | 36 | 7.3 | do | 100 | 135 | Do. |
| 5 | 36 | 5.85 | do | 100 | 124 | Very slight. |
| 5 | 40 | 5.25 | do | 100 | 110 | Slight. |
| 5 | 40 | 5.85 | do | 100 | 122 | Very slight. |

From these results it is apparent that the improved powder feeder design of this invention enhances uniform extruder operation even at high throughput.

We claim:
1. An improved apparatus for extruding relatively low bulk density subdivided plastic material comprising in combination:
   receiver means provided with a compression section for containing low bulk density plastic,
   conduit means forming a metering section communicating between the compression section of said receiver means and the inlet of extruding means,
   gathering and compressing means comprising a continuous helical flight mounted on a rotatable axis within said receiver means for continuously compressing said low bulk density plastic and forcing same through said compression section and into said conduit means, said flight cooperating with at least a portion of the inner wall of said compression section to prevent slippage of plastic thereby,
   metering and conveying means comprising a continuous helical flight mounted on a rotatable axis within said conduit means for receiving compressed bulk plastic from said gathering and compressing means and continuously passing the same to said extruder, said flight cooperating with at least a portion of the inner wall of said conduit to prevent slippage of plastic thereby, and
grooves substantially aligned with the direction of plastic feed on the interior walls and extending the length of said compression section and said metering section to the inlet of the extruding means to deter rotation of plastic as it moves through the receiver and conduit toward the extruder.

2. The apparatus of claim 1 wherein said gathering and compressing means has a compression ratio within the range of from about 3 to about 12.

3. The apparatus of claim 1 wherein the ratio of the depth of said helical flight at the inlet to said compression means to its radius at the outlet thereof is within the range of from about 1.5 to about 3 and the ratio of the pitch of said flight at said inlet to the pitch at said outlet is within the range of from about 0.75 to about 1.5.

4. The apparatus of claim 3 wherein the radius and pitch of said helical flight are substantially constant along the length of said conveying means within said conduit means.

References Cited

UNITED STATES PATENTS

| 2,369,359 | 2/1945 | MacWilliam et al. | |
| 2,933,175 | 4/1960 | Gray | 18—12X |
| 3,177,527 | 4/1965 | Nelson | 18—12 |
| 3,183,553 | 5/1965 | Slater | 18—12 |
| 3,310,617 | 3/1967 | Dygert et al. | 18—12X |

J. SPENCER OVERHOLSER, Primary Examiner